(12) United States Patent
Vaddadi et al.

(10) Patent No.: US 11,146,590 B2
(45) Date of Patent: Oct. 12, 2021

(54) OMNI-CHANNEL END-POINT SECURITY

(71) Applicant: NCR Corporation, Atlanta, GA (US)

(72) Inventors: Ramesh Vaddadi, Andhra Pradesh (IN); Krishna Kumari Rudraraju, Telangana (IN)

(73) Assignee: NCR Corporation, Atlanta, GA (US)

( * ) Notice: Subject to any disclaimer, the term of this patent is extended or adjusted under 35 U.S.C. 154(b) by 314 days.

(21) Appl. No.: 15/957,379

(22) Filed: Apr. 19, 2018

(65) Prior Publication Data
US 2019/0327270 A1    Oct. 24, 2019

(51) Int. Cl.
| | | |
|---|---|---|
| H04L 12/24 | (2006.01) | |
| G06F 11/30 | (2006.01) | |
| G06F 12/14 | (2006.01) | |
| H04L 29/06 | (2006.01) | |
| G06F 21/64 | (2013.01) | |
| G06F 21/57 | (2013.01) | |
| G06F 15/177 | (2006.01) | |
| G06F 8/61 | (2018.01) | |
| G06F 9/445 | (2018.01) | |

(52) U.S. Cl.
CPC ............ *H04L 63/20* (2013.01); *G06F 21/572* (2013.01); *G06F 21/645* (2013.01); *H04L 63/18* (2013.01); *G06F 8/61* (2013.01); *G06F 9/44505* (2013.01)

(58) Field of Classification Search
CPC ...... G06F 21/57; G06F 21/572; G06F 21/645; G06F 8/61; G06F 8/65; G06F 9/445051; H04L 63/18; H04L 63/20
See application file for complete search history.

(56) References Cited

U.S. PATENT DOCUMENTS

| | | | | |
|---|---|---|---|---|
| 7,020,842 | B1 * | 3/2006 | DeStefano | G06F 9/453 |
| | | | | 715/741 |
| 8,683,598 | B1 * | 3/2014 | Cashin | H04L 63/20 |
| | | | | 713/188 |
| 10,423,793 | B2 * | 9/2019 | Madou | G06F 21/577 |
| 2004/0034764 | A1 * | 2/2004 | Bulusu | G06F 9/4406 |
| | | | | 713/1 |
| 2006/0107255 | A1 * | 5/2006 | Chagoly | G06F 11/3495 |
| | | | | 717/127 |
| 2006/0259964 | A1 * | 11/2006 | Maldonado | G06F 21/604 |
| | | | | 726/16 |
| 2007/0180152 | A1 * | 8/2007 | Montanez | H04L 63/1416 |
| | | | | 709/250 |
| 2009/0037284 | A1 * | 2/2009 | Lewis | G06Q 20/202 |
| | | | | 705/16 |
| 2010/0049559 | A1 * | 2/2010 | Carbone | G06Q 10/06395 |
| | | | | 705/7.41 |
| 2010/0162347 | A1 * | 6/2010 | Barile | G06F 21/552 |
| | | | | 726/1 |
| 2011/0231361 | A1 * | 9/2011 | Patchava | G06F 21/577 |
| | | | | 707/602 |

(Continued)

*Primary Examiner* — Michael Simitoski
(74) *Attorney, Agent, or Firm* — Schwegman, Lundberg & Woessner (57) ABSTRACT

An Omni-channel security manager is provided. The Omni-channel security manager is configured to: receive selections for domain/channel specific security applications and deploy security agents to end-point devices. The security agents interact with the Omni-channel security manager to install, initiate, manage, and monitor the domain/channel specific security applications on the end-point devices.

20 Claims, 4 Drawing Sheets

(56) References Cited

U.S. PATENT DOCUMENTS

| | | | | |
|---|---|---|---|---|
| 2013/0219493 A1* | 8/2013 | Banzhof | ............... | H04L 63/145 726/22 |
| 2014/0215226 A1* | 7/2014 | Litty | ...................... | G06F 21/53 713/193 |
| 2014/0283012 A1* | 9/2014 | Eggerton | ................ | G06F 21/31 726/19 |
| 2015/0113258 A1* | 4/2015 | Grieco | .................. | G06F 21/572 713/2 |
| 2015/0244735 A1* | 8/2015 | Kumar | ............... | H04L 63/1425 726/23 |
| 2016/0014161 A1* | 1/2016 | Sato | ...................... | H04L 63/083 726/1 |
| 2016/0162668 A1* | 6/2016 | Yamazaki | ............... | H04L 67/42 726/28 |
| 2016/0173450 A1* | 6/2016 | Mircescu | .............. | H04W 76/32 726/14 |
| 2016/0323106 A1* | 11/2016 | Roper | ..................... | G06F 21/51 |
| 2017/0010875 A1* | 1/2017 | Martinez | ............... | G06F 21/575 |
| 2017/0116413 A1* | 4/2017 | Takacs | .................. | G06F 21/552 |
| 2018/0302409 A1* | 10/2018 | Hope | .................... | G06F 9/4881 |
| 2018/0324195 A1* | 11/2018 | Gupta | ................ | H04L 63/1416 |
| 2019/0050234 A1* | 2/2019 | Segal | ................... | G06F 11/3466 |
| 2019/0081982 A1* | 3/2019 | Breton | .................. | H04L 63/145 |
| 2020/0074435 A1* | 3/2020 | Baar | ................ | G06Q 20/38215 |
| 2020/0137107 A1* | 4/2020 | Jevans | .................... | G06F 21/56 |

\* cited by examiner

OMNI-CHANNEL END-POINT SECURITY

BACKGROUND

Security is of utmost concern across all industries. A day does not go by without a major announcement that some company has had a data breach and customers' confidential information was compromised. Companies are now facing legal scrutiny for inadequately providing security to protect electronic assets.

Security is even a greater concern for Self-Service Terminals (SSTs, such as Automated Teller Machines (ATMs)) that dispense currency to customers. An ATM, if compromised, can be depleted of currency or can expose customers' account information.

The issue for enterprises is that each domain or communication channel that the enterprise engages in business through requires its own unique security processing. Such that, a security product in one domain is unusable and not portable to a different domain; the different domain utilizes its own separate and unique security product.

This problem is confounded because security must exists end-to-end for any enterprise domain. That is, security is needed for any particular enterprise domain: on the customer-facing device, through any network connection of the customer-facing device, and the back-end server that communicates over the network connection with the customer-facing device.

Maintaining all these security products is expensive and labor intensive, requiring many skilled technicians for likely each domain of the enterprise. Additionally, security breaches can result in downtime for customer-facing devices, which means revenues can be adversely impacted because customer are unable to access the enterprise devices during a downtime.

Therefore, what is needed is improved Omni-channel (domain) end-point security for enterprises.

SUMMARY

In various embodiments, methods and a system for Omni-channel end-point security are presented.

According to an embodiment, a method for Omni-channel end-point security processing is presented. More particularly, a selection is received for a security application and an end-point device. The security application is configured for the end-point device as a domain/channel specific security application for a domain/channel associated with the end-point device. A security agent is deployed to the end-point device, the security agent installs and initiates the domain/channel specific security application on the end-point device.

DETAILED DESCRIPTION

Figure 1:
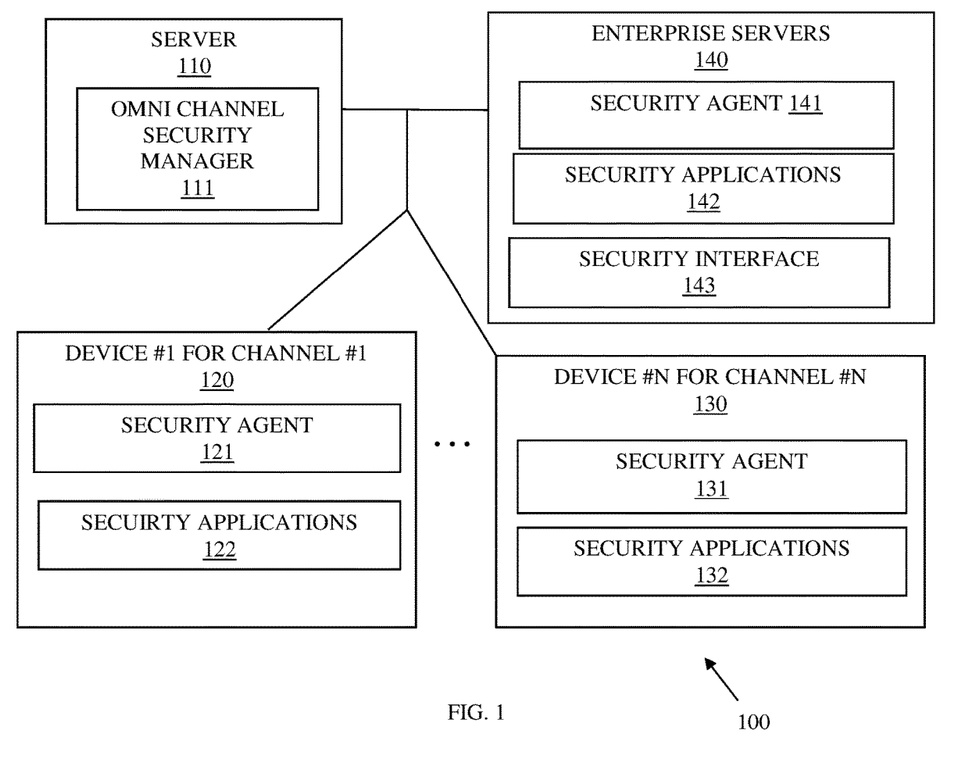
FIG. 1 is a diagram of a system for Omni-channel end-point security processing, according to an example embodiment.

FIG. 1 is a diagram of a system 100 for Omni-channel end-point security processing, according to an example embodiment. The various components are illustrated and the arrangement of the components is presented for purposes of illustration only. It is to be noted that other arrangements with more or less components are possible without departing from the Omni-channel end-point security teachings presented herein and below.

The techniques, methods, and system presented herein and below for Omni-channel end-point security processing can be implemented in whole or in part in one, all, or some combination of the components shown with the system 100. The techniques and methods are programmed as executable instructions in memory and/or non-transitory computer-readable storage media and processed on one or more processors associated with the various components.

As used herein the terms "customer," "consumer," and "user" may be used synonymously and interchangeably.

As used herein the phrases "Omni-channel," refers to processing that extends across multiple communication channels or processing domains. The channels can include communication and processing on: a Self-Service Terminal (SST), an Automated Teller Machine (ATM), a kiosk (travel, restaurant, hotel, grocery store, retailer, etc.), a Point-Of-Sale (POS) terminal operated by a clerk to checkout a customer at an enterprise, a mobile device operated by a customer, a server, a cloud processing environment, and the like.

The system 100 includes: a server 110 having an Omni-channel security manager 111 and a plurality of devices 120 and 130, each device 120 and 130 operating over a specific communication channel or domain. Each device 120 and 130 including a security agent 121 or 131 and a plurality of security applications 122 or 132. The system 100 also includes a plurality of enterprise services 140, each enterprise server 140 including a security agent 141, security applications 142, and a security interface 142.

The Omni-channel security manager 111 is configured to deploy the security agents 121 and 131 to the devices 120 and 130, respectively. The security agents 121 and 131 independently enforce security on their respective devices 120 and 130 and interact with the Omni-channel security manager 111 for enforcing security when interacting with the server 110 and enterprise servers 140.

Initially, the security interface 142 is operated by enterprise personnel to identify the security applications 122, 132, and 141 and to identify devices 120 and 130 with the Omni-channel security manager 111. The security interface 142 permits selection from a plurality of security applications to be made; the selection identifies the security applications 122, 132, and 142. Each security application (122, 132, 142) representing a specific type of desired end-point security being requested by the enterprise through the security interface 143.

The plurality of security applications available for selection as the security applications (122, 132, and 142) can include, by way of example on: device hardening (lock down menu, operations, and windows selectable and viewable from the devices 120 and 130), application/device whitelisting (security that is based on an identifier for a valid application/device (which can process or access the devices 120 and 130) being present in a whitelist file on the devices 120 and 130), device hard disk encryption, Binary Input/Output System (BIOS) remote and secure management including remote BIOS updating, operation or transaction validation through hashing algorithms and validation, and any other available security application being used or desired by the enterprise over the devices 120 and 130 and the domains (channels).

It is noted that in some instances the security applications 122 and 132 process on a processor of a peripheral device that is integrated into or interfaced with the devices 120 and 130. For example, a cash dispenser integrated into an ATM (device 120 or 130) that utilizes a custom transaction-based hashing algorithm for transactions to validate a dispense command to dispense currency from a safe of the ATM. The hashing algorithm and validation processing representing a particular security application 122 or 132.

The security interface 142 also permits the enterprise personnel to configure the security applications 122, 132, and 142, such as for generating encryption and decryption keys processed by the security applications 122, 132, and 142. Configuration can also identify wherein in a process flow the security applications 122, 132, and 142 are to enforce their security on the devices 120, 130, and 140. For example, processed when the device boots, as a pre-boot process within the BIOS, when a specific operation is attempted to be processed, during a transaction process flow, etc.

Once the security applications 122, 132, and 142 are selected and configured through the interface 143, the Omni-channel security manager 111 causes the security agents 121, 131, and 141 to be deployed and installed on the devices 120, 130, and 140. Once deployed, each security agent 121, 131, and 141 interacts with the Omni-channel security manager 111 to obtain the security applications 122, 132, and 142 and install the security applications 122, 132, and 142 on their respective devices 120, 130, and 140.

The security agents 121, 131, and 141 also report security audit information, receive updates to the application 122, 132, and 142 from the Omni-channel security manager 111, and monitor the applications 122, 132, and 142.

The security agents 121, 131, and 141 may also be responsible for dynamically checking the digital signatures or checksum values associated with each of the applications 122, 132, and 142 processing on their respective devices 120, 130, and 140. The security agents 121, 131, and 141 can remove any application 122, 132, and 142 from memory of the devices 120, 130, and 140 when signatures or checksum values are unable to be validated and shutdown operation of other processes on the devices 120, 130, and 140. In some situations, if checksum or signatures are corrupted and depending on the security application 122, 132, and 142, the agents 121, 131, and 141 may shut down the device 120, 130, and 140.

It is noted that an enterprise may also obtain (as mentioned above) security applications 142 for its servers 140 through the security interface 143 and the Omni-channel security manager 111.

Each endpoint device 120, 130, and 140 of an enterprise can custom select, custom configure, and custom deploy desired security applications 122, 132, and 142. The security applications 122, 132, and 142 are monitored and managed by the security agents 121, 131, and 141.

The system 100 allows an enterprise to custom manage and deploy security applications 122, 132, and 142 across a plurality of channels/domains (120, 130, and 140) with a single point of management through the Omni-channel security manager 111. This can substantially reduce enterprise staff and expense associated with maintaining enterprise security and permit security products (applications 122, 132, and 142) to be properly configured and deployed to different enterprise channels or domains through the Omni-channel security manager 111. Thus, security applications 122, 132, and 142 can be leveraged and used across domains (Omni-channel).

These embodiments and other embodiments are now discussed with reference to the FIGS. 2-4.

Figure 2:
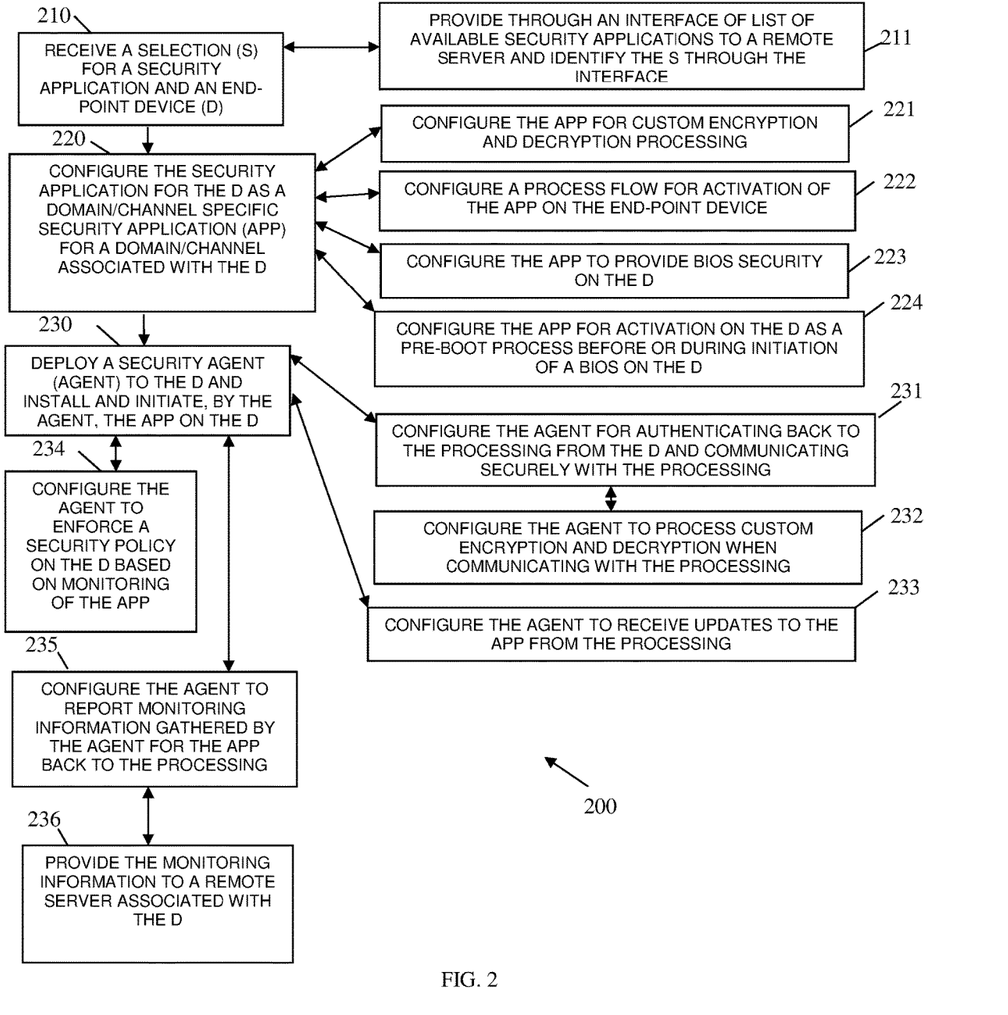
FIG. 2 is a diagram of a method for Omni-channel end-point security processing, according to an example embodiment.

FIG. 2 is a diagram of a method 200 for Omni-channel end-point security processing, according to an example embodiment. The software module(s) that implements the method 200 is referred to as an "Omni-channel security manager." The Omni-channel security manager is implemented as executable instructions programmed and residing within memory and/or a non-transitory computer-readable (processor-readable) storage medium and executed by one or more processors of a device. The processor(s) of the device that executes the Omni-channel security manager are specifically configured and programmed to process the c Omni-channel security manager. The Omni-channel security manager has access to one or more networks during its processing. The networks can be wired, wireless, or a combination of wired and wireless.

In an embodiment, the Omni-channel security manager is the Omni-channel security manager 111.

In an embodiment, the device that executes the Omni-channel security manager is the server 120.

In an embodiment, the device that executes the Omni-channel security manager is a plurality of servers logically organized as a cloud processing environment.

At 210, the Omni-channel security manager receives a selection for a security application and an end-point device. This can be through an interface with an enterprise server that is associated with the end-point device.

According to an embodiment, at 211, the Omni-channel security manager provides, through an interface, a list of available security applications to a remote server (operated by a user). The Omni-channel security manager identifies the selection through the interface based on actions taken by the user at the remote server.

At 220, the Omni-channel security manager configures the security application for the end-point device as a domain/channel specific security application for a domain/channel associated with the end-point device.

In an embodiment, at 221, the Omni-channel security manager configures the domain/channel specific security application for custom encryption and decryption processing.

In an embodiment, at 222, the Omni-channel security manager configures a process flow for activation of the domain/channel specific security application on the end-point device. This was discussed above with the description of the FIG. 1 and the system 100.

In an embodiment, at 223, the Omni-channel security manager configures the domain/channel specific security application to provide BIOS security on the end-point device.

In an embodiment, at 224, the Omni-channel security manager configures the domain/channel specific security application for activation on the end-point device as a pre-boot process before or during initiation of a BIOS on the end-point device.

At 230, the Omni-channel security manager deploys a security agent to the end-point device. Once deployed and initiated on the end-point device, the security agent installs and initiates the domain/channel specific security application on the end-point device.

In an embodiment, at 231, the Omni-channel security manager configures the security agent for authenticating back to the Omni-channel security manager from the end-point device and communicating securely with the Omni-channel security manager from the end-point device.

In an embodiment of 231 and at 232, the Omni-channel security manager configures the security agent to process custom encryption and decryption when communicating with the Omni-channel security manager.

In an embodiment, at 233, the Omni-channel security manager configures the agent to receive and install updates to the domain/channel specific security application that are received from the Omni-channel security manager.

In an embodiment, at 234, the Omni-channel security manager configures the security agent to enforce a security policy based on monitoring of the domain/channel specific security application.

In an embodiment, at 235, the Omni-channel security manager configures the security agent to report monitoring information gathered by the security agent for the domain/channel specific application back to the Omni-channel security manager.

In an embodiment of 235 and at 236, the Omni-channel security manager provides the monitoring information to a remote server associated with the end-point device.

Figure 3:
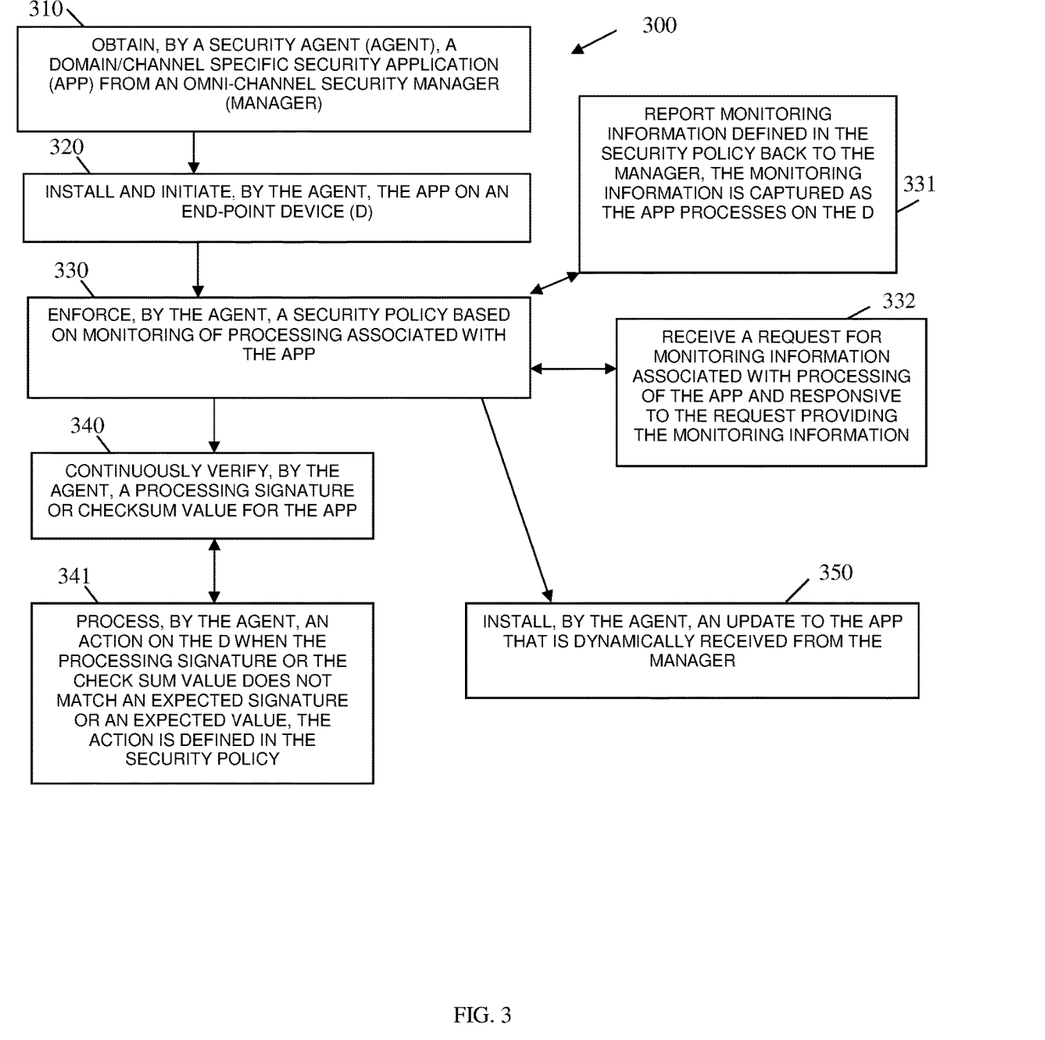
FIG. 3 is a diagram of another method for Omni-channel end-point security processing, according to an example embodiment.

FIG. 3 is a diagram of another method 300 for Omni-channel end-point security processing, according to an example embodiment. The software module(s) that implement the method 300 is referred to herein as a "security agent." The security agent is implemented as executable instructions and programmed within memory and/or a non-transitory computer-readable (processor-readable) storage medium that executes on one or more processors of a device. The processors of the device are specifically configured to execute the security agent. The security agent has access one or more networks; the networks can be wired, wireless, or a combination of wired and wireless.

In an embodiment, the security agent is one of: 121, 131, and 141.

In an embodiment, the device that executes the security agent is one of: device 120, device 130, and device 140.

Multiple independently custom configured instances of the security agent process within a networked environment. Each instance of the security agent responsible of a single end-point device of the network environment and configured for a domain/channel associated with that single end-point device.

The security agent is initially deployed by the Omni-channel security manager 111 or the method 200 to the device (channel or domain) that the security agent is responsible for monitoring and managing security on.

At 310, the security agent obtains a domain/channel specific security application from an Omni-channel security manager, such as the Omni-channel security manager 111 and/or the method 200.

At 320, the security agent installs and initiates for execution the domain/channel specific application on an end-point device (the same device that is executing the security agent).

At 330, the security agent enforces a security policy based on monitoring of the processing associated with the domain/channel specific security application. The security policy defining monitored information captured for the domain/channel specific security application and processing actions that the security agent is to process in response thereto.

In an embodiment, at 331, the security agent reports monitoring information defined in the security policy back to the Omni-channel security manager. The monitoring information is captured as the domain/channel specific security application processes on the end-point device.

In an embodiment, at 332, the security agent receives a request for monitoring information associated with the processing of the domain/channel specific security application and responsive to the request, the security agent provides the monitoring information to the Omni-channel security manager and/or an enterprise server associated with the end-point device (this is an on-demand request for the monitoring information processed by the security agent).

According to an embodiment, at 340, the security agent continuously verifies a digital processing signature or a checksum value for the domain/channel specific security application. This was discussed above with the FIG. 1 and the system 100.

In an embodiment of 340 and at 341, the security agent processes an action on the end-point device when the digital processing signature or the check sum value does not match an expected signature or an expected value for the domain/channel specific security application. The action is defined in the security policy. This can include a variety of actions discussed above with the FIG. 1 and the system 100, such as shutting down the end-point device, killing the processing instance of the domain/channel specific security application and the like.

In an embodiment, at 350, the security agent installs an update to the domain/channel specific security application that is dynamically received from the Omni-channel security manager.

Figure 4:
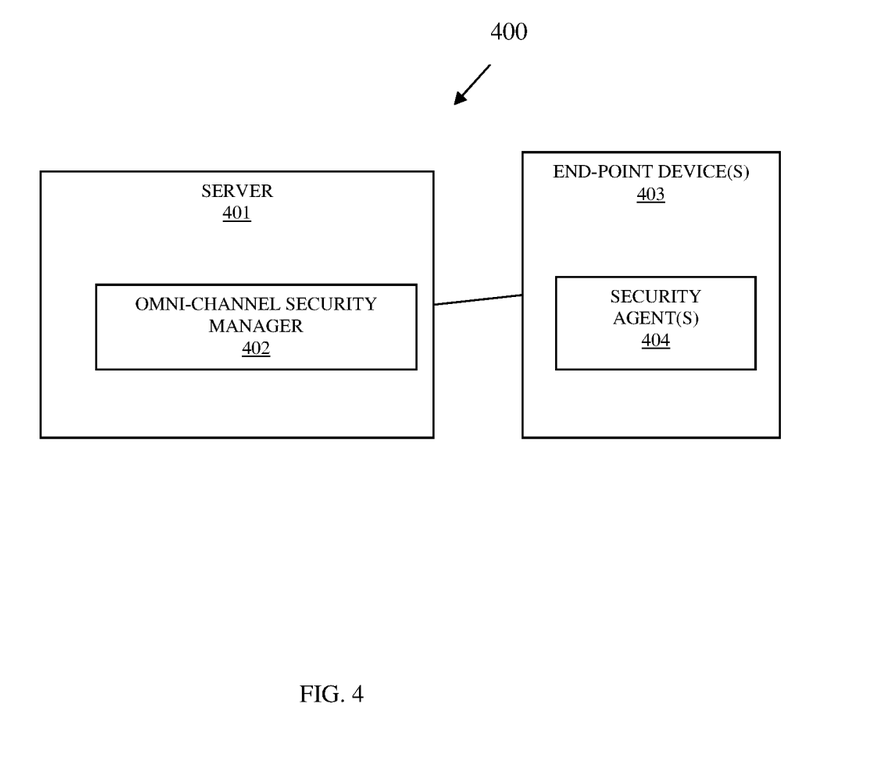
FIG. 4 is a diagram of another system for Omni-channel end-point security processing, according to an example embodiment.

FIG. 4 is a diagram of another system 400 for Omni-channel end-point security processing, according to an example embodiment. The components of the system 400 are programmed and reside within memory and/or a non-transitory computer-readable medium and execute on one or more processors of the devices of the system 400. The system 400 also has access and can communicate over one or more networks; and the networks can be wired, wireless, or a combination of wired and wireless.

The system 400 is configured and programmed to perform the processing discussed above with the FIGS. 1-3.

The system 400 includes a server 401 having an Omni-channel security manager 402 and at least one end-point device 403 having a security agent 404.

In an embodiment, the server 401 is the server 120.

In an embodiment, the server 401 is a part of a cloud processing environment.

In an embodiment, the Omni-channel security manager 402 is the Omni-channel security manager 111.

In an embodiment, the Omni-channel security manager 402 is the method 200.

In an embodiment, the at least one end-point device 403 is one or more of devices 120, 130, and 140.

In an embodiment, the security agent 404 is one of: security agents 121, 131, and 141.

In an embodiment, the security agent 404 is the method 300.

The Omni-channel security manager 402 executes on at least one hardware processor of the server 401 and is configured to: (i) receive a selection to a security application for the at least one end-point device 403, (ii) configure the security application as a domain/channel specific security application associated with a domain/channel associated with the at least one end-point device 403, and (iii) deploy the security agent 404 to the at least one end-point device 403.

The security agent 404 is executes on at least one hardware processor of the at least one end-point device 403 and is configured to: (i) obtain the domain/channel specific security application from the Omni-channel security manager 402 once deployed to the at least one end-point device 403, (ii) initiate the domain/channel specific security application on the at least one end-point device 403, and (iii) enforce a security policy in response to monitoring processing of the domain/channel specific security application on the at least one end-point device 403.

In an embodiment, the at least one end-point device 403 is one or more of: a SST (ATM, etc.), a POS terminal, a kiosk (travel, kitchen, restaurant, hotel, etc.), a mobile device, a network-voice enabled appliance, and a device that is part of the Internet-Of-Things (IoTs).

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    via a processor of a server:
        receiving a selection for a security application and an end-point device;
        configuring the security application for the end-point device as a domain/channel specific security application for a domain/channel associated with the end-point device, wherein configuring further includes configuring a process flow of the security application to identify within the process flow where security is enforced within the process flow during end-point device boots, during a pre-boot process of the endpoint device and when a specific operation is attempted to be processed on the end-point device during a transaction process flow of a transaction that is being performed using the end-point device;
        deploying a security agent to the end-point device, wherein deploying further includes installing and initiating, by the security agent, the domain/channel specific security application on the end-point device, and wherein deploying the security agent further includes configuring the security agent to dynamically check a digital signature of the domain/channel specific security application during processing of the domain/channel specific security application on the end-point device and when the digital signature is unable to be validated removing the domain/channel specific security application from memory of the end-point device and shutting down other processes of the end-point device; and
        monitoring and managing the security application for the domain/channel associated with the end-point device along with other deployed security applications for other domains/channels through a single point of management performed by the processor of the server.

2. The method of claim 1, wherein receiving further includes providing through an interface a list of available security applications to a remote server and identify the selection through the interface.

3. The method of claim 1, wherein configuring further includes configuring the domain/channel specific security application for custom encryption and decryption processing.

4. The method of claim 1, wherein configuring further includes configuring the process flow for activation of the domain/channel specific security application on the end-point device.

5. The method of claim 1, wherein configuring further includes configuring the domain/channel specific security application to provide Binary Input/Output System (BIOS) security on the end-point device.

6. The method of claim 1, wherein configuring further includes configuring the domain/channel specific security application for activation on the end-point device as a pre-boot process before or during initiation of a Binary Input/Output System (BIOS) on the end-point device.

7. The method of claim 1, wherein deploying further includes configuring the security agent for authenticating back to the server from the end-point device and communicating securely with the server.

8. The method of claim 7, wherein configuring the security agent further includes configuring the security agent to process custom encryption and decryption when communicating with the server.

9. The method of claim 1, wherein deploying further includes configuring the security agent to receive updates to the domain/channel specific security application from the processing.

10. The method of claim 1, wherein deploying further includes configuring the security agent to enforce a security policy on the end-point device based on monitoring of the domain/channel specific security application.

11. The method of claim 1, wherein deploying further includes configuring the security agent to report monitoring information gathered by the security agent for the domain/channel specific security application back to the server.

12. The method of claim 11, wherein configuring the security agent further includes providing the monitoring information to a remote server associated with the end-point device.

13. A method, comprising:
    obtaining, by a security agent deployed on an end-point device and executing on the end-point device, a domain/channel specific security application from an Omni-channel security manager, wherein the end-point device is a peripheral device that is interfaced to a second device as a peripheral of second device;
    installing and initiating, by the security agent, the domain/channel specific security application on the end-point device;

enforcing, by the security agent, a security policy, based on monitoring of processing associated with the domain/channel specific security application that is configured within a process flow the domain/channel specific security application associated with end-point device boots, a pre-boot process of the end-point device, and when a specific operation is attempted to be processed on the end-point device during a transaction process flow of a transaction that is being performed using the end-point device;

dynamically checking, by the security agent, a digital signature of the domain/channel specific security application during processing of the domain/channel specific security application on the end-point device; and removing, by the security agent, the domain/channel specific security application from memory of the end-point device and shutting down other processes on the end-point device when the digital signature is unable to be validated.

14. The method of claim 13 further comprising, continuously verifying, by the security agent, the digital signature or checksum value for the domain/channel specific security application.

15. The method of claim 14 further comprising, processing, by the security agent, an action on the end-point device when the digital signature or the check sum value does not match an expected signature or an expected value, wherein the action is defined in the security policy.

16. The method of claim 13 further comprising, installing, by the security agent, an update to the domain/channel specific security application that is dynamically received from the Omni-channel security manager.

17. The method of claim 13, wherein enforcing further includes reporting monitoring information defined in the security policy back to the Omni-channel security manager, wherein the monitoring information is captured as the domain/channel specific security application processes on the end-point device.

18. The method of claim 13, wherein enforcing further includes receiving a request for monitoring information associated with processing of the domain/channel specific security application on the end-point device and responsive to the request providing the monitoring information.

19. A system, comprising:
a server configured to execute an Omni-channel security manager; and
at least one end-point device configured to execute a security agent;

wherein the Omni-channel security manager is configured to: (i) receive a selection to a security application for the at least one end-point device, (ii) configure the security application as a domain/channel specific security application associated with a domain/channel of the at least one end-point device and configure a process flow of the security application associated with end-point device boots, a pre-boot process of the end-point device, and when a specific operation is attempted to be processed on the end-point device during a transaction process flow of a transaction that is being performed using the end-point device, (iii) deploy the security agent to the at least one end-point device, and (iv) monitor and manage the security agent for the domain/channel associated with the at least one end-point device along with other deployed security agents for other domains/channels through a single point of management performed by the Omni-channel security manager of the server;

wherein the security agent configured to: (i) obtain the domain/channel specific security application from the Omni-channel security manager once deployed to the at least one end-point device, (ii) initiate the domain/channel specific security application on the at least one end-point device, (iii) enforce a security policy in response to monitoring processing of the domain/channel specific security application on the at least one end-point device, wherein the security policy includes locking down menus, operations, and windows that are selectable and viewable from the at least one end-point device when the security policy is determined by the security agent to have been violated on the end-point device, (iv) dynamically check a digital signature of the domain/channel specific security application during processing of the domain/channel specific security application on the at least one end-point device, and (v) removing the domain/channel specific security application from memory of the end-point device and shut down other processes on the at least one end-point device when the digital signature is unable to be validated.

20. The system of claim 19, wherein the at least one end-point device is one or more of: a server, a Self-Service Terminal (SST), a Point-Of-Sale (POS) terminal operated by a clerk of one of the merchants, a kiosk, a mobile device, a network-voice enabled appliance, and a device that is part of the Internet-Of-Things (IoTs).

* * * * *